United States Patent
Sato et al.

(10) Patent No.: US 9,656,252 B2
(45) Date of Patent: May 23, 2017

(54) CATALYST COMPOSITION FOR PRODUCING HYDROCARBONS AND METHOD FOR PRODUCING HYDROCARBONS

(75) Inventors: Kazuhito Sato, Satte (JP); Shigenori Nakashizu, Satte (JP)

(73) Assignee: COSMO OIL CO., LTD., Tokyo (JP)

(*) Notice: Subject to any disclaimer, the term of this patent is extended or adjusted under 35 U.S.C. 154(b) by 614 days.

(21) Appl. No.: 13/503,671

(22) PCT Filed: Dec. 7, 2010

(86) PCT No.: PCT/JP2010/071906
§ 371 (c)(1),
(2), (4) Date: Apr. 24, 2012

(87) PCT Pub. No.: WO2011/074444
PCT Pub. Date: Jun. 23, 2011

(65) Prior Publication Data
US 2012/0208905 A1    Aug. 16, 2012

(30) Foreign Application Priority Data

Dec. 18, 2009 (JP) .................................. 2009-287596
Dec. 18, 2009 (JP) .................................. 2009-287597

(51) Int. Cl.
*B01J 29/48* (2006.01)
*B01J 29/076* (2006.01)
*C10G 2/00* (2006.01)
*B01J 23/656* (2006.01)
*B01J 23/889* (2006.01)
*B01J 27/232* (2006.01)

(52) U.S. Cl.
CPC ............. *B01J 29/48* (2013.01); *B01J 29/076* (2013.01); *C10G 2/334* (2013.01); *B01J 23/6562* (2013.01); *B01J 23/8892* (2013.01); *B01J 27/232* (2013.01); *C10G 2400/02* (2013.01)

(58) Field of Classification Search
USPC ................ 502/324, 325, 64, 71; 518/715
See application file for complete search history.

(56) References Cited

U.S. PATENT DOCUMENTS

| | | | |
|---|---|---|---|
| 4,049,584 A * | 9/1977 | Weissel | B01J 23/6562 502/313 |
| 4,120,910 A | 10/1978 | Chu | |
| 4,161,492 A | 7/1979 | Weissel | |
| 4,808,295 A | 2/1989 | Nemet-Mavrodin | |
| 4,912,273 A | 3/1990 | Harandi et al. | |
| 5,043,506 A | 8/1991 | Crossland | |
| 5,936,135 A | 8/1999 | Choudhary et al. | |
| 6,444,865 B1 * | 9/2002 | Barre | C10G 45/52 208/143 |
| 6,552,243 B2 | 4/2003 | Allison et al. | |
| 2006/0211777 A1 * | 9/2006 | Severinsky | 518/702 |
| 2007/0244206 A1 * | 10/2007 | Lvovich et al. | 518/716 |
| 2009/0143220 A1 | 6/2009 | Dias Junior et al. | |
| 2009/0156870 A1 | 6/2009 | Lauritzen et al. | |
| 2011/0112206 A1 | 5/2011 | Sato et al. | |

FOREIGN PATENT DOCUMENTS

| | | |
|---|---|---|
| JP | 60-146835 | 8/1985 |
| JP | 62-109888 | 5/1987 |
| JP | 2001-288123 | 10/2001 |
| JP | 2007-197628 | 8/2007 |
| WO | 2009/157260 | 12/2009 |

OTHER PUBLICATIONS

Xianguo et al., Studies on the F-T Performance of Iron Based Ultrafine Catalysts, Institute 0f Coal Chemistry. Chinese Academy of Sciences. Tdiyuan.*
Japanese Office Action dated Jun. 18, 2013 issued in corresponding Japanese Application No. 2009-287597. [With English Translation].
Ren et al., Study of the Coprecipitated Iron/Managanese Fischer-Tropsch Catalysts, Journal of Natural Gas Chemistry, vol. 5 No. 2, p. 152-160, 1996.
Ishihara et al., Hydrogenation of Carbon Monoxide over the Mixed Catalyst Composed of Co—Ni/MnO—$ZrO_2$ and Zeolite Catalyst, Chemistry Letters, p. 1699-1702, 1989.
International Search Report dated Mar. 15, 2011, issued in corresponding PCT Application No. PCT/JP2010/071906.
Mirzaei et al., "Effect of preparation conditions on the catalytic performance of cobalt manganese oxide catalysts for conversion of synthesis gas to light olefins", Applied Catalysis A: General, Elsevier Science, Amsterdam, NL, vol. 306, Jun. 7, 2006, pp. 98-107.
M. Baerns et al., "Catalyst development for selective conversion of syngas to mainly aromatic hydrocarbons", International Journal of Energy Research, vol. 18, No. 2, Mar. 1, 1994, pp. 197-204.
F. G. Botes et al., "The addition of HZSM-5 to the Fischer-Tropsch process for improved gasoline production", Applied Catalysis A: General, Elsevier Science, Amsterdam, NL, vol. 267, No. 1-2, Jul. 30, 2004, pp. 217-225.

(Continued)

Primary Examiner — Melvin C Mayes
Assistant Examiner — Sheng H Davis
(74) Attorney, Agent, or Firm — Andrews Kurth Kenyon LLP (57) ABSTRACT

There are provided a catalyst composition for producing hydrocarbons and a method for producing hydrocarbons which exhibit a high CO conversion rate, generates minimal amount of gaseous components, and is also capable of efficiently obtaining, from a syngas, a gasoline fraction which is selective for and rich in the components having a high octane number, such as aromatic, naphthenic, olefinic and branched paraffinic hydrocarbons, by using a Fischer-Tropsch synthesis catalyst that contains at least one type of metal exhibiting activity in Fischer-Tropsch reaction and manganese carbonate and a zeolite serving as a solid acid.

1 Claim, 1 Drawing Sheet (56) References Cited

OTHER PUBLICATIONS

G. Baeurle, K. Guse, M. Lohrengel, and H. Papp, "Conversion of syngas to aromatic hydrocarbons on cobalt-manganese-zeolite catalysts", Studies in Surface Science and Catalysis, vol. 75, Jun. 19, 1992, pp. 2789-2792.

Extended European Search Report dated Jan. 8, 2014 issued in corresponding EP Application No. 10837473.7.

Chen Junwu, et al., "Shi You Ti Dai Zang Lun," May 31, 2009; pp. 499-501, [Partial English Translation].

Fischer-Tropsch synthesis on Fe—Mn ultrafine catalysts; *Institute of Coal Chemistry, Chinese Academy of Science*, Taiwan 030001, PR China ; Catalysis Letters 23 (1994), 245-246.

Office Action dated Apr. 30, 2014 issued in corresponding Chinese Application No. 201080052949.6 [with English Translation].

Office Action dated Aug. 21, 2015 issued in corresponding Chinese Application No. 201080052949.6. [with English Translation].

Office Action issued on Sep. 30, 2016, in corresponding Malaysian Patent Application No. PI2012700209.

\* cited by examiner

CATALYST COMPOSITION FOR PRODUCING HYDROCARBONS AND METHOD FOR PRODUCING HYDROCARBONS

TECHNICAL FIELD

The present invention relates to a catalyst composition to be used in producing hydrocarbons from a mixed gas containing hydrogen and carbon monoxide as main components (hereinafter referred to as "syngas") by a Fischer-Tropsch (FT) reaction, and also relates to a method for producing hydrocarbons from the syngas by the FT reaction. More specifically, the present invention relates to a catalyst composition for producing hydrocarbons characterized by containing an FT synthesis catalyst that contains manganese carbonate and FT active metal, and a zeolite serving as a solid acid, and also relates to a method for producing hydrocarbons characterized by using the FT synthesis catalyst and the zeolite.

This application is a national stage application of International Application No. PCT/JP2010/071906, filed Dec. 7, 2010, which claims priority to Japanese Patent Application No. 2009-287596 and Japanese Patent Application No. 2009-287597, filed Dec. 18, 2009, the contents of which are incorporated herein by reference.

BACKGROUND ART

As methods for synthesizing hydrocarbons from a syngas, the Fischer-Tropsch reaction (hereafter, referred to as an "FT reaction"), a methanol synthesis reaction and the like are well known. It is known that the FT reaction proceeds with a catalyst containing, as an active metal, an iron group element such as iron, cobalt and nickel, or a platinum group element such as ruthenium and the like; whereas the methanol synthesis reaction proceeds with a copper based catalyst; and the oxygen-containing C2 compound (such as ethanol and acetaldehyde) synthesis proceeds with a rhodium based catalyst (see, for example, Non-Patent Document 1).

Incidentally, in recent years, a diesel fuel of low sulfur content has been desired from the viewpoint of air environmental conservation, and it may be considered that this trend still more increases hereafter. Moreover, from the viewpoint that crude oil resources are limited or from the standpoint of energy security, it is desired to develop an alternative fuel, and it may be considered that this development is strongly desired more and more hereafter. As a technology responding to these desires, there is GTL (gas to liquids) which is a technology for synthesizing liquid fuels such as kerosene and gas oil and the like from a natural gas (main component: methane) whose proven reserves are said to be comparable to a crude oil in terms of energy. The natural gas does not contain a sulfur content; or even if it contains a sulfur content, the sulfur content is hydrogen sulfide ($H_2S$) or the like which is easy for desulfurization, and therefore, the resulting liquid fuel such as kerosene and gas oil and the like does not substantially contain a sulfur content and possesses an advantage that it can be utilized as a high-performance diesel fuel having a high cetane number. Thus, this GTL has recently attracted attention more and more.

As a part of the foregoing GTL, a method for producing hydrocarbons from a syngas by the FT reaction has been actively investigated. The hydrocarbons obtained by this FT reaction include a wide range of hydrocarbons from methane to wax as well as a trace amount of oxygen-containing compounds such as various alcohols, and it is impossible to produce a certain specific fraction selectively. Thus, for example, in order to efficiently obtain fractions of kerosene and gas oil by the FT reaction, in addition to the fractions of kerosene and gas oil that are produced directly by the FT reaction, production of kerosene and gas oil fractions through hydrocracking of the wax fraction, which is heavier, to increase the yield of kerosene and gas oil fractions has been commonly performed.

On the other hand, the gasoline fraction can also be obtained by the FT reaction. However, because the hydrocarbons produced by the FT reaction are mainly composed of linear paraffins and olefins, the gasoline fraction obtained by the FT reaction has a very low octane number and no practical use. The octane number of hydrocarbons is usually the highest among aromatic hydrocarbons, followed by naphthenic hydrocarbons, olefinic hydrocarbons and paraffinic hydrocarbons in this order. Moreover, among the hydrocarbons of the same group, those with fewer carbon atoms, in other words, those with lower boiling points tend to have higher octane number, and those with more branches among those having the same number of carbon atoms tend to have higher octane number.

Conventionally, a method for producing a gasoline fraction through decomposition and isomerization of the hydrocarbons generated by the FT reaction using a solid acid catalyst such as zeolite has been proposed. For example, a method (one-step method) has been proposed for producing a gasoline fraction from syngas by one-step reaction using a catalyst that includes both an FT synthesis catalyst containing an FT active metal species (metal species that exhibits activity in the FT reaction), such as ruthenium and cobalt, and ZSM-5 or β-zeolite (see, for example, Patent Documents 1 and 2). In addition, a method (two-step method) has also been proposed for producing a gasoline fraction by a two-step reaction in which a reaction using an FT synthesis catalyst and a reaction using a solid acid catalyst are both conducted at the optimum temperatures (see, for example, Patent Documents 3).

CITATION LIST

Patent Documents

[Patent Document 1] Japanese Unexamined Patent Application, First Publication No. Sho 62-109888
[Patent Document 2] Japanese Unexamined Patent Application, First Publication No. 2007-197628
[Patent Document 3] Japanese Unexamined Patent Application, First Publication No. 2001-288123

Non-Patent Document

[Non-Patent Document 1] "C1-Chemistry", edited by Catalysis Society of Japan, published by Kodansha Ltd., 1984, page 25

SUMMARY OF INVENTION

Technical Problem

In the one-step method among the conventional methods, because the FT synthesis catalyst and solid acid catalyst have different optimum reaction temperature ranges, both reactions cannot be carried out efficiently together, which is a problem. For example, when a reaction is effected at a relatively low temperature which is optimal for the FT synthesis catalysts, production of lower hydrocarbons such as $CH_4$ is suppressed while higher hydrocarbons having 5 or more carbon number are produced efficiently. However, a solid acid catalyst exhibits low activity because of the low temperature, which reduces the degrees of decomposition and isomerization reaction of the produced hydrocarbons as well as the gasoline yield, and also reduces producing hydrocarbons having high octane number such as aromatic hydrocarbons and branched hydrocarbons. On the other hand, when a reaction is effected at a temperature optimal for the solid acid catalyst, the production of lower hydrocarbons such as $CH_4$ and gas components such as $CO_2$ is promoted in the FT reaction, which causes problems such as the reduction of gasoline yield.

On the other hand, in the two-step method, it is possible to allow the reactions to proceed at the optimum temperatures for the respective catalysts, and is also possible to produce a gasoline fraction efficiently. However, there are problems such as the increase in the process cost, as well as the reduction of the olefin fraction in the products, although isoparaffins are produced, because of the introduction of hydrogen before the second-step reaction in order to allow the hydrocracking to proceed, which leads to a decline in the octane number.

In the present invention, an object is to provide a catalyst composition for producing hydrocarbons which exhibits a high CO conversion rate, generates minimal amount of gaseous components, and can also yield a gasoline fraction selective for and rich in the components having a high octane number, such as aromatic, naphthenic, olefinic and branched paraffinic hydrocarbons, by a one-step reaction from syngas. In addition, another object of the present invention is to provide a method for efficiently obtaining the gasoline fraction from syngas.

Solution to Problem

In order to attain the foregoing object, the present inventors made extensive and intensive investigations. As a result, it has been found that by using an FT synthesis catalyst containing manganese carbonate and metal species active in the FT reaction and a zeolite serving as a solid acid, it is possible to achieve higher activity while producing a lesser amount of gaseous components, and also to produce a gasoline fraction having a high octane number and rich in the components such as aromatic, naphthenic, olefinic and branched paraffinic hydrocarbons, as compared to the conventionally reported methods for producing a gasoline fraction from syngas, leading to accomplishment of the invention.

In the present invention, catalyst compositions for producing hydrocarbons as shown below in the following aspects (1) to (3) are provided.
(1) A catalyst composition for producing hydrocarbons characterized by containing a Fischer-Tropsch synthesis catalyst that contains at least one type of metal exhibiting activity in the Fischer-Tropsch reaction and manganese carbonate, and a zeolite serving as a solid acid.
(2) The catalyst composition for producing hydrocarbons according to the above aspect (1), wherein the aforementioned metal is at least one type of metal selected from the group consisting of ruthenium and cobalt.
(3) The catalyst composition for producing hydrocarbons according to the above aspect (1) or (2), wherein the aforementioned zeolite is ZSM-5.

In the present invention, methods for producing hydrocarbons as shown below in the following aspects (4) to (9) are provided.

(4) A method for producing hydrocarbons characterized by having a step of FT reaction for synthesizing hydrocarbons from a gas composed mainly of hydrogen and carbon monoxide using a Fischer-Tropsch synthesis catalyst that contains at least one type of metal exhibiting activity in the Fischer-Tropsch reaction and manganese carbonate; and a step of conversion reaction in which the hydrocarbons obtained by the FT reaction are brought into contact with a zeolite serving as a solid acid.
(5) The method for producing hydrocarbons according to the above aspect (4), wherein the aforementioned FT reaction and the aforementioned conversion reaction are carried out at the same time in the same reaction vessel.
(6) The method for producing hydrocarbons according to the above aspect (5), wherein the aforementioned FT reaction and the aforementioned conversion reaction are carried out using a catalyst composition containing the aforementioned Fischer-Tropsch synthesis catalyst and a zeolite serving as a solid acid.
(7) The method for producing hydrocarbons according to any one of the above aspects (4) to (6), wherein the aforementioned FT reaction and the aforementioned conversion reaction are carried out at 230 to 350° C.
(8) The method for producing hydrocarbons according to any one of the above aspects (4) to (7), wherein the aforementioned metal is at least one type of metal selected from the group consisting of ruthenium and cobalt.
(9) The method for producing hydrocarbons according to any one of the above aspects (4) to (8), wherein the aforementioned zeolite is ZSM-5.

Advantageous Effects of Invention

By using a catalyst composition for producing hydrocarbons according to the present invention, it is possible to achieve a high CO conversion rate from a syngas serving as a raw material and to generate minimal amount of gaseous components, and also to efficiently obtain a gasoline fraction selective for and rich in the components having a high octane number, such as aromatic, naphthenic, olefinic and branched paraffinic hydrocarbons, by a one-step reaction from syngas.

In the method for producing hydrocarbons according to the present invention, it is possible to achieve a high CO conversion rate from a syngas serving as a raw material and to generate minimal amount of gaseous components, and also to efficiently obtain a gasoline fraction selective for and rich in the components having a high octane number, such as aromatic, naphthenic, olefinic and branched paraffinic hydrocarbons, from syngas.

DESCRIPTION OF EMBODIMENTS

One example of an embodiment for carrying out the present invention is shown below.

A catalyst composition according to the present embodiment contains at least one type of FT synthesis catalyst that includes manganese carbonate and FT active metal species, and a zeolite serving as a solid acid.

A method for producing hydrocarbons according to the present embodiment is characterized by having a step of FT reaction for synthesizing hydrocarbons from a gas composed mainly of hydrogen and carbon monoxide using an FT synthesis catalyst that contains at least one type of metal exhibiting activity in the FT reaction and manganese carbonate; and a step of conversion reaction in which the hydrocarbons obtained by the FT reaction are brought into contact with a zeolite serving as a solid acid.

Details regarding the possible production of a gasoline fraction having a high octane number very efficiently, as compared to the conventionally known methods, by the catalyst composition of the present embodiment or the method of producing hydrocarbons according to the present embodiment have not been elucidated yet and currently under intensive and extensive studies, but are presumed as follows. In the reaction using the catalyst composition according to the present embodiment, the hydrocarbons synthesized from syngas by an FT synthesis catalyst are moderately degraded or isomerized by coming into contact with a zeolite serving as a solid acid. In general, in order to efficiently conduct such decomposition or isomerization reaction of hydrocarbons by zeolites, it is preferable to allow zeolites to react with hydrocarbons at 230° C. or higher. In the present embodiment, it is presumed that by using an FT synthesis catalyst that contains manganese carbonate as the FT synthesis catalyst, generation of lower hydrocarbons having 1 to 4 carbon atoms and gaseous components such as $CO_2$ is suppressed even in high reaction temperatures, hydrocarbons can be produced efficiently, and also solid acid catalysts (zeolites) act effectively at high temperatures, thereby making it possible to produce a gasoline fraction having a high octane number.

Hereafter, from the preparation of the catalyst composition according to the present embodiment, the method for producing hydrocarbons according to the present embodiment, and to the method for producing hydrocarbons using the catalyst composition according to the present embodiment will be described in sequence.

<Preparation of Catalyst Composition>

An FT synthesis catalyst used in the present embodiment contains at least one type of FT active metal species and manganese carbonate.

The catalyst composition according to the present embodiment contains at least one type of FT synthesis catalyst that includes manganese carbonate and FT active metal species, and a zeolite serving as a solid acid.

Examples of the FT active metal species included in the FT synthesis catalyst that constitutes the catalyst composition of the present embodiment include nickel, cobalt, iron and ruthenium. Of these, ruthenium or cobalt is preferably selected as the metal species with a higher activity. Moreover, these metal species can also be used singly, or can be used in admixture of two or more kinds thereof.

As the manganese carbonate included in the FT synthesis catalyst that constitutes the catalyst composition of the present embodiment, commercially available reagents may be used, or those produced by conventionally known methods may also be used. Examples of the conventionally known methods for producing manganese carbonate include a method of reacting a solution of soluble manganese salt with ammonia or an alkali carbonate solution. Moreover, manganese carbonate is also obtainable through a reaction between a divalent manganese ion and a carbonate ion or a bicarbonate ion.

As one of methods for incorporating the FT active metal species into manganese carbonate, there is a method of making manganese carbonate to support the FT active metal species through impregnation. Manganese carbonate is made to support the FT active metal species through a normal impregnation method. For example, by immersing manganese carbonate in an aqueous solution of a ruthenium salt or a cobalt salt, manganese carbonate is impregnated with a ruthenium salt or cobalt salt, followed by drying and calcination. In those cases where manganese carbonate is made to support two or more kinds of metals as the FT active metal species, there are no particular limitations, and a method in which an aqueous solution containing both ruthenium salt and cobalt salt is prepared, and manganese carbonate is impregnated with this aqueous solution, followed by drying and calcination may be adopted, or a stepwise method in which manganese carbonate is impregnated with an aqueous solution of ruthenium salt and an aqueous solution of cobalt salt separately, followed by drying and calcination may be adopted.

Examples of ruthenium salts include water-soluble ruthenium salts such as ruthenium chloride, ruthenium nitrate, ruthenium acetate and hexaammonia ruthenium chloride. Moreover, cobalt chloride, cobalt nitrate, cobalt acetate, cobalt sulfate or cobalt formate can be preferably used as the cobalt salt. It should be noted that instead of aqueous solutions, the solution of ruthenium salts or cobalt salts used in the impregnation method can also be prepared as a solution of organic solvents such as alcohols, ethers and ketones. In this case, a salt which is soluble in various organic solvents is selected.

The content of ruthenium in the FT synthesis catalyst on the basis of the catalyst is from 0.1 to 5% by mass, preferably from 0.3 to 4.5% by mass, and more preferably from 0.5 to 4% by mass in terms of a metal amount. The content of ruthenium is related to the number of active sites. When the content of ruthenium is less than 0.1% by mass, the number of active sites becomes insufficient and sufficient catalytic activity may not be obtained. On the other hand, when the content of ruthenium exceeds 5% by mass, ruthenium is not sufficiently supported on a support such as manganese carbonate, so that reduction in the dispersion properties or the development of ruthenium species having no interaction with the carrier component is likely to occur. Thus, it is undesirable to support ruthenium more than necessary because it simply increases the catalyst cost.

The content of cobalt in the FT synthesis catalyst on the basis of the catalyst is from 5 to 40% by mass, preferably from 5 to 35% by mass, and more preferably from 5 to 30% by mass in terms of a metal amount. When the content of cobalt is less than 5% by mass, the amount of cobalt serving as an active metal is too low, so that notable effects of activity improvement may not be observed. On the other hand, when the content of cobalt exceeds 40% by mass, cobalt easily aggregates in the subsequent drying and calcination treatments and under the FT reaction conditions, which may lead to decline in the number of active sites. Furthermore, when the content of cobalt becomes excessive, it is undesirable because the specific surface area and pore volume of the catalyst may be reduced, and also the amount of gaseous components generated in the product tends to increase.

Other components can also be included in the FT synthesis catalyst constituting the catalyst composition of the present embodiment, as long as the FT reaction by manganese carbonate and FT active metal species is not inhibited. Examples of other components include inorganic oxides which are usually used as a support, such as silica, alumina and silica-alumina. The content of these support (inorganic oxide) components in the FT synthesis catalyst can be appropriately set as long as the effects of manganese carbonate and FT active metal species are not inhibited, and 5 to 50% by mass is generally adequate on the basis of the support (i.e., the sum of the content of these support components and the content of manganese carbonate).

Further, alkali metal species can also be included in the FT synthesis catalyst constituting the catalyst composition of the present embodiment, in addition to manganese carbonate and the FT active metal species. Examples of the alkali metal species include lithium, sodium, potassium and rubidium. Of these, sodium or potassium is preferably selected. These alkali metal species can also be used singly, or can be used in admixture of two or more kinds thereof.

There are no particular limitations on the method for including the alkali metal species in the FT synthesis catalyst in addition to manganese carbonate and the FT active metal species. For example, as in the case of FT active metal species, alkali metal species can be supported on manganese carbonate through impregnation. More specifically, for example, manganese carbonate is impregnated with an aqueous solution of a sodium salt or a potassium salt, followed by drying and calcination. It should be noted that there are no particular limitations on the order of supporting the FT active metal species and the alkali metal species on manganese carbonate, and they can also be supported at the same time by immersing manganese carbonate in an aqueous solution containing both of them. Moreover, water-soluble salts such as chlorides, nitrates, acetates and carbonates are preferable as the sodium salt or potassium salt supported on manganese carbonate through impregnation.

The content of alkali metals such as sodium and potassium in the FT synthesis catalyst on the basis of the catalyst is preferably from 0.05 to 3% by mass, more preferably from 0.05 to 2% by mass, and still more preferably from 0.1 to 1.5% by mass in terms of a metal amount. By adjusting the content of sodium or potassium to 0.05% by mass or more, the effect of suppressing the amount of produced gaseous components becomes marked. Moreover, by adjusting the content of sodium or potassium to not more than 3% by mass, it becomes possible to suppress the amount of produced gaseous components without lowering the FT activity.

Manganese carbonate is impregnated with an FT active metal species such as ruthenium or cobalt, followed by drying and calcination. Drying at this time is, in principle, carried out in order to evaporate the solvent such as water which is used when making manganese carbonate to support the FT active metal species through impregnation, and the drying temperature is preferably from 80 to 200° C., and more preferably from 100 to 150° C. By adjusting the drying temperature to 80° C. or higher, evaporation of water or the like can be sufficiently promoted. On the other hand, by adjusting the drying temperature to not higher than 200° C., uneven distribution of active metal components caused by the rapid evaporation of water or the like can be suppressed.

Moreover, the calcination temperature is preferably from 150 to 350° C., more preferably from 150 to 300° C., and still more preferably from 150 to 250° C. When the calcination temperature greatly exceeds 350° C., it is undesirable because manganese carbonate in the catalyst component is decomposed into manganese oxides and carbon dioxide. It is essential that manganese carbonate in the FT synthesis catalyst component according to the present embodiment be present in the form of carbonate salts, and the effects of the present embodiment cannot be obtained with manganese oxide. On the other hand, when the calcination temperature is too low, it is undesirable because the FT active metal species cannot be activated.

The drying and calcination time cannot be determined unconditionally based on the amount of treatment, although it is usually from 1 to 10 hours. If the treatment time is less than 1 hour, it is undesirable because the evaporation of water may be unsatisfactory, or the FT active metal species is activated only slightly. Moreover, even when the treatment time exceeds 10 hours, the catalytic activity remains substantially unchanged, as compared to the case where the treatment time is not more than 10 hours. Therefore, in view of workability and productivity, the treatment time is preferably not more than 10 hours. In this respect, this drying or calcination treatment may be carried out in air, in an inert gas atmosphere of nitrogen or helium, or in a reducing gas atmosphere of hydrogen or the like, and it is not particularly limited.

In addition to the aforementioned impregnation method, examples of the methods for producing an FT synthesis catalyst containing manganese carbonate and FT active metal species include a method in which an aqueous slurry containing manganese carbonate and FT active metal species is prepared, followed by spray drying of this slurry. Although the concentration of the slurry in this case is not particularly limited, if the slurry concentration is too low, the precipitation of manganese carbonate occurs so that the catalyst component becomes heterogeneous, which is undesirable. On the other hand, if the slurry concentration is too high, it becomes difficult to supply the slurry. Therefore, an appropriate slurry concentration is selected. Furthermore, at that time, for the purposes of adjusting the concentration of the slurry, enhancing moldability of the catalyst and making it spherical, it is also possible to add a silica sol or the like as a binder component. The amount of binder added in this case is preferably an amount so as not to lower the catalytic activity, and is generally selected in the range of 5 to 20% by mass.

In the case of obtaining an FT synthesis catalyst by the spray drying method, there are a method of spraying a slurry prepared by simultaneously incorporating manganese carbonate, the FT active metal species and the binder component therein; and a method of spraying a slurry containing manganese carbonate and a binder and then adding the FT active metal species to the obtained spray dried product in accordance with the aforementioned impregnation method. Note that it is preferable to carry out the spray drying method so that the blast temperature falls within the above-mentioned drying and calcination temperature ranges.

Furthermore, examples of other methods for preparing the FT synthesis catalyst constituting the catalyst composition of the present embodiment include a method in which manganese carbonate is immersed in an aqueous solution of FT active metal species so that the active metal is adsorbed onto manganese carbonate; a method in which the active metal is deposited on manganese carbonate by ion exchange; and a method in which the active metal is deposited onto manganese carbonate by adding a precipitant such as alkali when immersing manganese carbonate in an aqueous solution of FT active metal species.

Although the aforementioned calcination treatment is carried out for the purpose of activating the FT active metal species, besides the calcination treatment or in addition to the calcination treatment, it is also possible to achieve the activation by a treatment with an alkaline aqueous solution. More specifically, a post-treatment to immerse the FT synthesis catalyst in which the FT active metal species is supported by manganese carbonate in an alkaline aqueous solution is carried out. As the alkaline aqueous solution, ammonia water, an aqueous solution of sodium hydroxide, an aqueous solution of potassium hydroxide, an aqueous solution of sodium carbonate, an aqueous solution of potassium carbonate or the like can be used, and ammonia water can be preferably used. The concentration of alkali in the alkaline aqueous solution is from 0.05 to 1 N, preferably from 0.05 to 0.5 N, and more preferably from 0.05 to 0.2 N. When the concentration of alkali is less than 0.05 N, the effects of treatment using the alkaline aqueous solution become sparse, and even when the calcination treatment is subsequently conducted, an enhancement of the catalytic activity may not be observed to a great extent. On the other hand, when the concentration of alkali in the alkaline aqueous solution exceeds 1 N, the amount of unreacted alkali components increases, which is not only uneconomical, but also increases the amount of water and time required for the washing treatment. It should be noted that although the time for the treatment with the alkaline aqueous solution varies depending on the concentration of alkali components, in general, it is preferably from 1 to 10 hours.

After the treatment with the alkaline aqueous solution, washing with water is carried out to sufficiently wash away the excessive alkali components, followed by the aforementioned drying and calcination treatments. It should be noted that after supporting the FT active metal species on manganese carbonate through impregnation, this treatment with an alkaline aqueous solution may be carried out after drying or may be carried out after calcination, and it is not particularly limited. In addition, this treatment can also be carried out with respect to a catalyst obtained by spray drying or a molded catalyst.

As a zeolite constituting the catalyst composition according to the present embodiment, there are no particular limitations as long as the zeolite serves as a solid acid, and the zeolite appropriately selected from the known zeolites can be used. Solid acids are those that exhibit Bronsted acidity or Lewis acidity on the solid surface, and those that exhibit the activity for homogeneous and heterogeneous acid-catalyzed reactions. The hydrocarbons synthesized by the FT reaction are decomposed or isomerized by coming into contact with the acid on the solid surface of zeolite.

Preferred examples of zeolites include ZSM-5,13-zeolites, Y-type zeolites, USY zeolites, and mordenite, although ZSM-5 is particularly preferable. With respect to zeolites, commercially available products may be used, or those obtained by hydrothermal synthesis through known methods can also be used. Although these zeolites usually contain an alkali metal as an ion-exchangeable cation, the zeolite used in the present embodiment is a zeolite having 50% or more of the cations replaced with protons, alkaline earth metal ions, transition metal ions or rare earth metal ions and also preferably exhibiting solid acidity, and H(proton)-ZSM-5 in particular is preferably used.

The catalyst composition according to the present embodiment may be any composition as long as it contains an FT synthesis catalyst and a zeolite, and may be prepared using any method known in the art. For example, it is possible to prepare the catalyst composition according to the present embodiment by first preparing the FT synthesis catalyst and the zeolite separately and then physically mixing the two. In addition, it is also possible to prepare the catalyst composition according to the present embodiment by supporting an FT active metal on a molded composite composed of manganese carbonate and zeolite through impregnation by the method described above.

As a method of mixing the FT synthesis catalyst and the zeolite prepared separately, for example, the FT synthesis catalyst and the zeolite may be mixed physically to form a homogeneous mixture or the FT synthesis catalyst and the zeolite may be laminated and filled in one container to form a laminate. When forming a laminate, it may be any laminate as long as each of these two forms at least one layer, and the laminate may also be prepared by filling in one container alternately with an FT synthesis catalyst and a zeolite so that a layer composed of the FT synthesis catalyst and a layer composed of the zeolite are laminated alternately.

In addition, although molding is required when using the catalyst composition in an actual device, conventionally known methods can be used also with respect to the molding methods. For example, it is possible to mold the catalyst composition according to the present embodiment by subjecting a mixture of FT synthesis catalyst and zeolite to a known molding method. Alternatively, the catalyst composition according to the present embodiment can be molded by subjecting a catalyst composition, which is obtained by supporting an FT active metal on a molded composite composed of manganese carbonate and zeolite through impregnation by the method described above, to a known molding method. Examples of such known molding methods include tablet molding, extrusion molding, and beading. Note that these molding methods can be carried out by conventional methods.

During molding, with respect to the catalyst composition, it is also possible to mix silica, alumina or the like as a binder component for improving moldability, or to add molding auxiliary agents such as cellulose-based molding auxiliary agents, epoxy-based molding auxiliary agents and PVA to an extent so that the catalytic activity is not adversely affected, in order to improve the extrusion properties.

In the catalyst composition according to the present embodiment, the content ratio of the FT synthesis catalyst in the catalyst composition is from 10 to 90% by weight, preferably from 20 to 80% by weight, and more preferably from 30 to 60% by weight. Those cases where 10% by weight or more of the FT synthesis catalyst is included are preferable because producing hydrocarbons by the FT reaction proceeds satisfactorily. In addition, when the content of the FT synthesis catalyst is 90% by weight or less, it is possible to incorporate a sufficient amount of zeolite in the catalyst composition.

Further, with respect to the catalyst composition according to the present embodiment, the content of zeolite in the catalyst composition is preferably not less than 10% by weight. It is preferable if 10% by weight or more of zeolite is incorporated because the produced hydrocarbons are efficiently decomposed or isomerized on zeolite and converted into a gasoline fraction.

<Method for Producing Hydrocarbons>

The method for producing hydrocarbons according to the present embodiment includes a step of FT reaction for synthesizing hydrocarbons from a syngas using the above-mentioned FT synthesis catalyst; and a step of conversion reaction in which the hydrocarbons obtained by the FT reaction are brought into contact with a zeolite serving as a solid acid. When the hydrocarbons are brought into contact with the zeolite, the hydrocarbons are converted by a variety of reactions such as decomposition reactions and isomerization reactions. As a result, it is presumed to increase the gasoline fraction.

The FT reaction can be performed by the methods known in the art or suitable modifications thereof, with the exception that the aforementioned specific FT synthesis catalyst is used as a catalyst. More specifically, for example, the FT reaction can be carried out by bringing a syngas into contact with the aforementioned specific FT synthesis catalyst.

Similarly, the conversion reaction is also not particularly limited and can be performed by the methods known in the art or suitable modifications thereof, as long as the method uses the aforementioned specific zeolite as a catalyst and is capable of bringing this zeolite into contact with the hydrocarbons obtained by the FT reaction.

The method for producing hydrocarbons according to the present embodiment may be a two-step method where the FT reaction process and the conversion reaction process are conducted separately. By conducting the FT reaction process and the conversion reaction process separately, each reaction process can be carried out individually under optimized reaction conditions. In general, the conversion reaction of hydrocarbons with zeolite is carried out efficiently at higher temperatures. Thus, for example, after conducting the FT reaction process, it is also possible to subject the synthesized hydrocarbons to a conversion reaction process performed at higher temperatures than that in the FT reaction process. In addition, at the start of conversion reaction process, hydrogen may be further added in the reaction vessel.

In those cases where the FT reaction process and the conversion reaction process are conducted separately, after conducting the FT reaction by making the syngas to pass through a reaction vessel where an FT synthesis catalyst is charged in advance, the conversion reaction can be carried out by introducing the synthesized hydrocarbons into a separate reaction vessel where a zeolite is loaded in advance. Alternatively, after the FT reaction, the conversion reaction may be carried out by charging a zeolite into the reaction vessel where the FT reaction has been conducted.

The method for producing hydrocarbons according to the present embodiment may be a one-step method where the FT reaction and the conversion reaction are conducted simultaneously in the same reaction vessel. By conducting the FT reaction and the conversion reaction in one single process, the work process is simplified which is economical. The FT synthesis catalyst used in the present embodiment is a particularly superior catalyst, since the CO conversion rate and the C5+ selectivity (namely, the selectivity for the synthesis of hydrocarbons having 5 or more carbon atoms) are high even at high temperature conditions of 230 to 350° C. Therefore, in the method for producing hydrocarbons according to the present embodiment, it is possible to efficiently synthesize hydrocarbons while suppressing the production of gaseous components or the like, even when the FT reaction is conducted in the same reaction conditions as those in the conversion reaction by zeolite.

When conducting the FT reaction and the conversion reaction at the same time in the same reaction vessel, the FT synthesis catalyst and zeolite may be charged separately into the reaction vessel, the zeolite catalyst and synthetic FT, or the aforementioned catalyst composition containing both the FT synthesis catalyst and zeolite may be prepared in advance to load this catalyst composition into the reaction vessel.

Although the form of the reaction vessel in each reaction is not particularly limited, examples thereof include a fixed bed, a fluidized bed, a suspended bed and a slurry bed. In those cases where the FT reaction and the conversion reaction are conducted in a separate reaction vessel, the form of the reaction vessel in both reactions may be the same or may be different from each other.

In the method for producing hydrocarbons using the aforementioned catalyst composition, the catalyst composition prepared in the manner described above is provided for the reaction. As an example of one-step method, a method for producing hydrocarbons using a fixed bed is described below.

When evaluating the activity of the catalyst in a fixed bed, the form of the catalyst is preferably a molded product such as an extruded product, a bead product or the like since the catalyst powder may cause differential pressure in the reaction vessel. In terms of the size of the FT synthesis catalyst, zeolite and catalyst composition used in the present embodiment, although depending on the size of the reaction vessel, the catalyst preferably has a particle size of 0.5 mm to 5 mm, and more preferably 1.0 mm to 3 mm. When the particle size is 0.5 mm or more, an increase in the differential pressure inside the reaction vessel can be suppressed satisfactorily. On the other hand, by adjusting the particle size to 3 mm or less, it is possible to improve the effectiveness factor of the catalyst so as to allow the reaction to proceed efficiently.

The catalyst composition according to the present embodiment is subjected to a reduction treatment (activation treatment) in advance, before being provided to the reaction.

Due to this reduction treatment, the catalyst is activated so as to exhibit a desired catalytic activity in the reaction. In those cases where this reduction treatment is not conducted, the FT active metal species is not sufficiently reduced, and thus a desired catalytic activity cannot be achieved. The temperature for the reduction treatment is preferably from 140 to 350° C., and more preferably from 150 to 300° C. If the reduction treatment temperature is less than 140° C., the FT active metal species is not sufficiently reduced, and thus a sufficient reaction activity cannot be achieved. In addition, at high temperatures greatly exceeding 350° C., the decomposition of manganese carbonate serving as the catalyst component to manganese oxide proceeds, thereby increasing the possibility of lowering the activity.

A reducing gas composed mainly of hydrogen can be preferably used for this reduction process. The reducing gas to be used may contain components other than hydrogen, for example, water vapor, nitrogen, a rare gas or the like, in an amount so as not to impair the reduction. This reduction treatment is affected not only by the aforementioned treatment temperature but also by the hydrogen partial pressure and the treatment time. The hydrogen partial pressure in the reduction treatment is preferably from 0.1 to 10 MPa, more preferably from 0.5 to 6 MPa, and most preferably from 0.9 to 3 MPa. Although the reduction treatment time varies depending on the amount of catalyst, the amount of hydrogen passed through and the like, in general, it is preferably from 0.1 to 72 hours, more preferably from 1 to 48 hours, and most preferably from 3 to 48 hours. If the treatment time is less than 0.1 hours, the activation of the catalyst may become insufficient. On the other hand, although the catalyst is not adversely affected even when the reduction treatment is conducted for a prolonged period of time exceeding 72 hours, it is undesirable because the treatment cost increases while no improvement in the catalyst performance can be observed.

The method for producing hydrocarbons can be carried out by making a syngas to pass through the catalyst composition according to the present embodiment which has been subjected to a reduction treatment as described above.

The syngas to be used may be any gas as long as hydrogen and carbon monoxide are included as main components, and other components may be included as long as they do not inhibit the reaction. For example, as one example, in the method for producing hydrocarbons using the catalyst composition according to the present embodiment, a syngas obtained by the gasification of biomass can be used. Examples of the types of biomass used in this example include the resource biomass in the field of agriculture, forestry and fisheries, such as food, building materials and pulp; waste biomass such as wastes from agriculture and forestry and livestock wastes; and plantation biomass such as sugar cane, palm and seaweed. Of these, it is preferable to use unused waste biomass which does not interfere with the food supply system. There are no particular limitations on the method for biomass gasification. For example, various methods for biomass gasification are available, including direct gasification, indirect gasification, gasification at normal pressure and gasification at applied pressure; and a wide range of forms for the gasification furnace are also available, including a fixed bed, a fluidized bed and an entrained bed. In the method for producing hydrocarbons using the catalyst composition according to the present embodiment, biomass gasified by any of these methods may be used.

Because the reaction rate (k) depends on the hydrogen partial pressure almost linearly, it is desirable that a partial pressure ratio of hydrogen to carbon monoxide (H2/CO molar ratio) is 0.6 or more. Since this reaction is a reaction involving a decrease in the volume, it is preferable that a total value of partial pressures of hydrogen and carbon monoxide is as high as possible. Although the partial pressure ratio of hydrogen to carbon monoxide varies in the gasification of biomass described above, depending on the differences in the type of materials and gasification methods, the upper limit thereof is not particularly limited in the present embodiment.

A practical range of this partial pressure ratio of hydrogen to carbon monoxide is suitably from 0.6 to 2.7, preferably from 0.8 to 2.5, and more preferably from 1 to 2.3. If this partial pressure ratio is less than 0.6, the yield of produced hydrocarbons tends to decrease. On the other hand, when this partial pressure ratio exceeds 2.7, the amount of gaseous components in the produced hydrocarbons tends to increase.

Further, in the method for producing hydrocarbons using the catalyst composition according to the present embodiment, there is no problem even if carbon dioxide is also present in the syngas. In terms of the carbon dioxide coexisting in the syngas, for example, those obtained from the reforming reaction of petroleum products or from a natural gas or the like can be used without any problem. In addition, the carbon dioxide incorporated as other components which do not interfere with the FT reaction can also be present in the syngas. A carbon dioxide component which also includes water vapor, partially oxidized nitrogen or the like, for example, those produced from the steam reforming reaction of petroleum products or the like may also be used.

It is also possible to prepare a gas by adding such carbon dioxide intentionally to a syngas containing no carbon dioxide, and then to make this gas to pass through the catalyst composition according to the present embodiment. In addition, it is also possible to make a syngas containing carbon dioxide, which is obtained by reforming of natural gas through an autothermal reforming method, a steam reforming method or the like, to pass through the catalyst composition according to the present embodiment, as it is without decarboxylation treatment, to provide for the reaction. By providing the syngas containing carbon dioxide as it is for the reaction, the construction costs and operating costs of a facility required for the decarboxylation treatment can be reduced, thereby reducing the production cost of the obtained hydrocarbons.

The total pressure (total value of partial pressures of all of the components) of the syngas (mixed gas) to be provided for the reaction is preferably from 0.3 to 10 MPa, more preferably from 0.5 to 7 MPa, and still more preferably from 0.8 to 5 MPa. When the total pressure is low, it is undesirable because the chain growth becomes insufficient and the yield of gasoline fraction, fraction of kerosene and gas oil, wax fraction or the like tends to decline. In view of equilibrium, it is more advantageous as the partial pressures of hydrogen and carbon monoxide increase. However, the cost for plant construction tends to increase as the partial pressures increase, and the operating cost also tends to increase as the size of a compressor or the like which is required for compression increases. Therefore, from the industrial viewpoints, the upper limit for the partial pressures is controlled.

The contact time (hereafter, described as W/F: weight/flow [g·h/mol]) between the syngas and the catalyst in the FT reaction is preferably from 1 to 100, more preferably from 1.5 to 90, and still more preferably from 2 to 80. The W/F value varies depending on the throughput and the performance of the catalyst used, but in general, if the W/F value of 1 or more, a sufficient CO conversion rate can be achieved, and the yield of liquid products increases. In addition, if the W/F value is less than 100, it is possible to suppress unnecessary enlargement of the reaction vessel due to the increase in the amount of catalyst used.

In this FT synthesis catalyst, in general, when an $H_2/CO$ molar ratio of the syngas is the same, the lower the reaction temperature is, the higher the chain growth probability and the C5+ selectivity (selectivity for the synthesis of hydrocarbons having 5 or more carbon atoms) are, although the CO conversion rate reduces. In contrast, when the reaction temperature increases, the chain growth probability and the C5+ selectivity decrease, although the CO conversion rate increases. In addition, when the $H_2/CO$ ratio increases, the CO conversion rate increases, and the chain growth probability and the C5+ selectivity decrease. When the $H_2/CO$ ratio decreases, the results are reversed. Degrees of the effects of these factors on the FT reaction depend on the types of the catalyst used or the like. When the method of producing hydrocarbons according to the present embodiment is carried out by one-step method in which the FT reaction and the conversion reaction are conducted simultaneously in the same reaction vessel, the reaction temperature is from 230 to 350° C., preferably from 240 to 310° C., and more preferably from 250 to 300° C. If the reaction temperature is 230° C. or higher, both the FT synthesis catalyst and zeolite act efficiently, so that it becomes possible to produce a gasoline fraction having a high octane number through the production, decomposition reaction, and isomerization reaction of hydrocarbons. Moreover, by adjusting the reaction temperature to 350° C. or less, it becomes possible to suppress the undesirable production of gaseous components on the FT synthesis catalyst and to suppress the generation of gaseous components due to excessive decomposition on the zeolite.

It should be noted that the CO conversion rate and the selectivity for various products are defined in accordance with the following expression.

[CO Conversion Rate]

CO conversion rate=[(number of moles of CO in the raw material gas per unit time)−(number of moles of CO in the outlet gas per unit time)]/(number of moles of CO in the raw material gas per unit time)×100

EXAMPLES

The present embodiment will be described in more detail below using a series of Examples, although the present embodiment is in no way limited by the following Examples.

In the following Examples, a CO analysis was conducted using a thermal conductivity detector-gas chromatograph (TCD-GC) that used Active Carbon (60/80 mesh) as a separation column. As a raw material gas, a syngas (mixed gas of $H_2$ and CO) to which Ar was added in an amount of 25% by volume as an internal standard was used. Qualitative and quantitative analyses were conducted by comparing peak positions and peak areas of CO with those of Ar. In addition, the composition analysis of products was conducted using a hydrogen flame ionization detector gas chromatograph (FID-GC) that used a capillary column (TC-1). Identification of the chemical components of catalysts was conducted by Inductively Coupled Plasma (ICP) Atomic Emission Spectroscopy (CQM-10000P, manufactured by Shimadzu Corporation).

Example 1

As manganese carbonate, manganese (II) carbonate n-hydrate, manufactured by Wako Pure Chemical Industries, Ltd. was used. 8.00 g of manganese carbonate which was dried at 150° C. for 5 hours in advance was weighed and dispersed in 9.71 g of silica sol SI-550 ($SiO_2$ content: 20.6%) manufactured by Catalysts & Chemicals Industries Co., Ltd. and used as a binder component, and then the resultant was dried in air for 3 hours at 120° C. and then calcined in air at 200° C. 4.85 g of this calcined product was impregnated with an aqueous solution obtained by dissolving 0.368 g of ruthenium chloride (Ru Assay, manufactured by Kojima Chemicals Co., Ltd., 40.79% by mass), and the resultant was allowed to stand for 1 hour. Thereafter, the resultant was dried in air at 80° C. for 3 hours and then further calcined at 150° C. for 3 hours to obtain a catalyst a, which was an FT synthesis catalyst. As a result of structural analysis by X-ray diffraction, it was found that manganese in the catalyst a remained in the form of manganese carbonate. Moreover, the catalyst a was subjected to a chemical composition analysis by ICP Atomic Emission Spectroscopy. As a result, it was found that the ruthenium content was 2.9% by mass in terms of metal.

4 g of the catalyst a and 4 g of H-ZSM-5 (MFI-90 manufactured by Süd-Chemie Catalysts Japan, Inc.) were mixed thoroughly in a mortar to obtain a catalyst A, which was a catalyst composition according to the present embodiment.

In order to confirm the activity of catalyst A, 6 g of catalyst A was diluted with 34.6 g of silicon carbide (100 mesh) and charged into a reaction tube having an inner diameter of 10 mm, and reduction was conducted for 3 hours by making hydrogen to pass through at a hydrogen partial pressure of 0.9 MPa·G at temperature of 170° C., at a flow rate of 100 (STP) mL/min (STP: standard temperature and pressure). After the reduction, hydrogen was switched to a syngas having an $H_2$/CO ratio of about 2 (containing about 25% by volume of Ar), and the reaction was conducted by setting the temperature at 260° C. and the total pressure at 0.9 MPa·G.

The contact time (W/F: weight/flow [g·h/mol]) of syngas ($H_2$+CO) with the catalyst A was about 13.4 g·h/mol. It should be noted that because the mixed H-ZSM-5 exhibits no activity at all with respect to the FT reaction, the W/F value is expressed as a contact time of syngas for the catalyst a which is an FT synthesis catalyst in the catalyst A. Table 1 and FIG. 1 show the reaction results and the results of composition analysis of the products obtained during this reaction, and Table 2 shows the analytical results of the individual products based on the types of hydrocarbons, respectively.

Comparative Example 1

A catalyst b was obtained in the same manner as in Example 1, except for using manganese (III) oxide ($Mn_2O_3$), manufactured by Wako Pure Chemical Industries, Ltd. in place of manganese carbonate. As a result of structural analysis by X-ray diffraction, it was found that manganese was in the form of $Mn_2O_3$. The catalyst b was subjected to a chemical composition analysis by ICP Atomic Emission Spectroscopy. As a result, it was found that the ruthenium content was 3.0% by mass in terms of metal. This catalyst b was provided for the FT reaction as it is without mixing with a zeolite. The FT reaction was carried out in the same manner as in Example 1.

Figure 1:
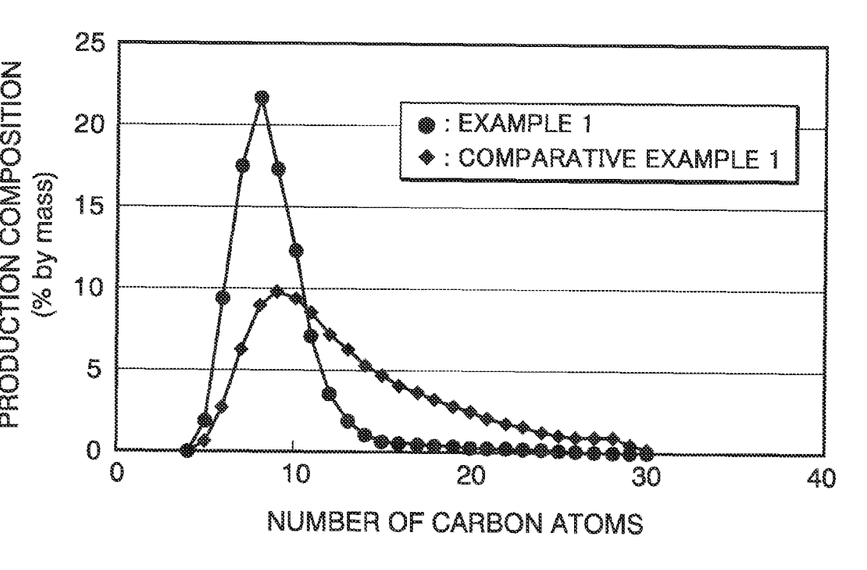
FIG. 1 is a diagram showing the results of composition analysis of the obtained product in Example 1 and Comparative Example 1.

Table 1 and FIG. 1 show the reaction results and the results of composition analysis of the products obtained during this reaction, and Table 2 shows the analytical results of the individual products based on the types of hydrocarbons.

Example 2

The reaction was carried out in the same manner as in Example 1 using the catalyst A, except for conducting the reaction at a reaction temperature of 270° C. Table 1 shows the reaction results and the results of composition analysis of the products obtained during this reaction.

Example 3

The reaction was carried out in the same manner as in Example 1 using the catalyst A, except for conducting the reaction at a reaction temperature of 280° C. Table 1 shows the reaction results and the results of composition analysis of the products obtained during this reaction.

Example 4

As manganese carbonate, manganese (II) carbonate n-hydrate, manufactured by Wako Pure Chemical Industries, Ltd. was used. After being dried at 150° C. for 5 hours in advance, 4.5 g of manganese carbonate was weighed and impregnated with an aqueous solution obtained by dissolving 2.46 g of cobalt nitrate ($Co(NO_3)_2 \cdot 6H_2O$, manufactured by Wako Pure Chemical Industries, Ltd.) in 3.0 g of water, and then allowed to stand for one hour. Thereafter, the resultant was dried in air at 80° C. for 3 hours and then further calcined at 200° C. for 5 hours to obtain a catalyst c, which was an FT synthesis catalyst. As a result of structural analysis by X-ray diffraction, it was found that manganese in the catalyst c remained in the form of manganese carbonate. Moreover, the catalyst c was subjected to a chemical composition analysis by ICP Atomic Emission Spectroscopy. As a result, it was found that the cobalt content was 10.0% by mass in terms of metal.

4 g of the catalyst c and 4 g of H-ZSM-5 (MFI-90 manufactured by Süd-Chemie Catalysts Japan, Inc.) were mixed thoroughly in a mortar to obtain a catalyst B, which was a catalyst composition according to the present embodiment. The reaction was carried out in the same manner as in Example 1 using the catalyst B, except for changing the reduction temperature to 350° C. The results are shown in Table 3.

Comparative Example 2

In place of manganese carbonate, the spherical silica (Q-30, manufactured by Fuji Silysia Chemical Ltd.) was used to produce an FT synthesis catalyst. More specifically, 4.5 g of spherical silica (Q-30), which had been sufficiently dried in advance was weighed and impregnated with an aqueous solution obtained by dissolving 2.46 g of cobalt nitrate $(Co(NO_3)_2 \cdot 6H_2O$, manufactured by Wako Pure Chemical Industries, Ltd.) in 5.54 g of water, and then allowed to stand for one hour. Thereafter, the resultant was dried in air at 80° C. for 3 hours and then further calcined at 200° C. for 3 hours to obtain a catalyst d. The catalyst d was subjected to a chemical composition analysis by ICP Atomic Emission Spectroscopy. As a result, it was found that the cobalt content was 10.1% by mass in terms of metal.

Comparative Example 3

4 g of the catalyst d and 4 g of H-ZSM-5 (MFI-90 manufactured by Süd-Chemie Catalysts Japan, Inc.) were mixed thoroughly in a mortar to obtain a catalyst e. The reaction was carried out in the same manner as in Example 4 using the catalyst e. The results are shown in Table 3.

TABLE 1

|  | Ex. 1 | Comp. Ex. 1 | Ex. 2 | Ex. 3 |
| --- | --- | --- | --- | --- |
| Catalyst | Catalyst A | Catalyst b | Catalyst A | Catalyst A |
| Reaction temperature (° C.) | 260 | 260 | 270 | 280 |
| CO conversion rate (%) | 74.3 | 52.4 | 77.3 | 80.7 |
| $CO_2$ selectivity (%) | 0.7 | 0.5 | 1.4 | 1.6 |
| $CH_4$ selectivity (%) | 10.0 | 9.2 | 12.9 | 19.0 |
| C2-C4 selectivity (%) | 6.2 | 8.4 | 7.6 | 8.6 |
| C5+ selectivity (%) | 83.1 | 81.9 | 78.1 | 70.8 |
| Product composition (mass %) | | | | |
| Gasoline fraction (C4-C10) | 80.6 | 38.5 | 87.3 | 88.7 |
| Kerosene and gas oil (C11-C21) | 17.7 | 51.3 | 12.6 | 11.3 |
| Wax fraction (C22+) | 1.7 | 10.2 | 0.1 | 0.0 |

From the results shown in Table 1, it is clear that when using a catalyst composition containing an FT synthesis catalyst that includes an FT active metal and manganese carbonate and zeolite (Example 1), as compared to the case where a catalyst composition containing an FT synthesis catalyst that includes an FT active metal and manganese oxide but no zeolite is used (Comparative Example 1), although no significant differences were observed in terms of gas selectivity or C5+ selectivity, the CO conversion rate was very high, and also the proportion of gasoline fraction in the product was very high. In particular, as shown in FIG. 1, it is apparent that by including a zeolite in the catalyst composition, hydrocarbons having longer chains with more carbon atoms are selectively isomerized or degraded and are converted to a gasoline fraction.

In addition, by using the catalyst composition containing manganese carbonate according to the present embodiment, it is also clear that the reaction proceeds sufficiently even at reaction temperatures as high as 260 to 280° C.

TABLE 2

|  |  | n-paraffin | i-paraffin | Olefin | Naphthene | Aromatic |
| --- | --- | --- | --- | --- | --- | --- |
|  |  |  | mass % |  |  |  |
| Ex. 1 | Catalyst A | 13.1 | 17.0 | 53.2 | 8.1 | 8.6 |
| Comp. Ex. 1 | Catalyst b | 48.0 | 2.8 | 48.7 | 0.5 | 0.0 |

As shown in Table 2, when the types of produced hydrocarbons obtained by the reaction are compared, it is clear that proportions of aromatic, naphthenic, olefinic and branched paraffinic hydrocarbons which have a high octane number are increased due to the mixing of zeolite.

TABLE 3

|  | Ex. 4 | Comp. Ex. 2 | Comp. Ex. 3 |
| --- | --- | --- | --- |
| Catalyst | Catalyst B | Catalyst d | Catalyst e |
| Reaction temperature (° C.) | 260 | 260 | 260 |
| CO conversion rate (%) | 63.3 | 40.1 | 37.7 |
| $CO_2$ selectivity (%) | 6.8 | 10.7 | 12.1 |
| $CH_4$ selectivity (%) | 11.2 | 41.3 | 45.9 |
| C2-C4 selectivity (%) | 7.7 | 7.7 | 8.1 |
| C5+ selectivity (%) | 74.3 | 40.3 | 33.9 |
| Product composition (mass %) | | | |
| Gasoline fraction (C4-C10) | 81.5 | 45.1 | 90.2 |
| Kerosene and gas oil (C11-C21) | 16.6 | 46.6 | 9.8 |
| Wax fraction (C22+) | 1.9 | 8.3 | 0.0 |

As is apparent from Table 3, even when using an FT synthesis catalyst containing manganese carbonate and having cobalt as an FT active metal (Example 4), it is possible to efficiently produce a gasoline fraction by mixing a zeolite, as in the case of using ruthenium as an FT active metal (Example 1). Furthermore, when using silica instead of manganese carbonate (Comparative Examples 2 and 3), it is evident that although the proportion of gasoline fraction in the product can be increased by mixing a zeolite (Comparative Example 3), a very large amount of gaseous components were produced (i.e., C5+ selectivity was very low) and the CO conversion rate was also low. From these results, it became clear that in order to efficiently produce a gasoline fraction, it is very important to use a catalyst composition according to the present embodiment containing both an FT synthesis catalyst that includes manganese carbonate and a zeolite.

Example 5

The reaction was carried out in the same manner as in Example 1 using the catalyst A, except for introducing a syngas having an $H_2$/CO ratio of about 1.5 (containing about 38% by volume of Ar) as a raw material syngas. Table 4 shows the reaction results and the results of composition analysis of the products obtained during this reaction.

Comparative Example 4

The same reaction as in Example 5 was carried out except for using the catalyst e. Table 4 shows the reaction results and the results of composition analysis of the products obtained during this reaction.

Example 6

The reaction was carried out in the same manner as in Example 1 using the catalyst A, except for introducing a syngas having an H₂/CO ratio of about 2.5 (containing about 13% by volume of Ar) as a raw material syngas. Table 4 shows the reaction results and the results of composition analysis of the products obtained during this reaction.

Comparative Example 5

The same reaction as in Example 6 was carried out except for using the catalyst e. Table 4 shows the reaction results and the results of composition analysis of the products obtained during this reaction.

TABLE 4

| | Ex. 5 | Comp. Ex. 4 | Ex. 6 | Comp. Ex. 5 |
|---|---|---|---|---|
| Catalyst | Catalyst A | Catalyst e | Catalyst A | Catalyst e |
| Reaction temperature (° C.) | 260 | 260 | 260 | 260 |
| CO conversion rate (%) | 46.4 | 20.1 | 83.1 | 38.0 |
| CO₂ selectivity (%) | 0.6 | 10.0 | 1.0 | 18.9 |
| CH₄ selectivity (%) | 7.2 | 29.7 | 21.7 | 78.1 |
| C2-C4 selectivity (%) | 6.9 | 7.8 | 8.4 | 10.1 |
| C5+ selectivity (%) | 85.3 | 52.5 | 68.9 | 11.8 |
| Product composition (mass %) | | | | |
| Gasoline fraction (C4-C10) | 79.1 | 89.7 | 84.6 | 93.2 |
| Kerosene and gas oil (C11-C21) | 18.1 | 10.5 | 14.3 | 6.8 |
| Wax fraction (C22+) | 2.8 | 0.2 | 1.1 | 0.0 |

As is apparent from Table 4, according to the present embodiment, liquid hydrocarbons can be obtained efficiently even when the H₂/CO ratio of the raw material syngas is somewhat varied. In other words, the catalyst composition of the present embodiment is capable of carrying out the reaction by using syngas of various sources as a raw material gas. In addition, syngas of various sources can be used as a raw material syngas in the method for producing hydrocarbons of the present embodiment.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

INDUSTRIAL APPLICABILITY

The present invention relates to a catalyst composition for producing hydrocarbons and a method for producing hydrocarbons. According to the catalyst composition of the present invention, high activity can be achieved because a Fischer-Tropsch synthesis catalyst that contains at least one type of metal exhibiting activity in the Fischer-Tropsch reaction and manganese carbonate and a zeolite serving as a solid acid are included. In the method for producing hydrocarbons according to the present invention using this catalyst composition, it is possible to generate minimal amount of gaseous components and also to produce a gasoline fraction rich in aromatic, naphthenic, olefinic and branched paraffinic hydrocarbons and having a high octane number.

The invention claimed is:

1. A catalyst composition comprising:
   a Fischer-Tropsch synthesis catalyst exhibiting activity in a Fischer-Tropsch reaction,
   wherein manganese carbonate is impregnated with at least one of Co or Ru in the catalyst,
   wherein the content of Ru in the catalyst is in a range of 0.1 to 5% by mass of the catalyst, and
   wherein the content of Co in the catalyst is in a range of 5 to 40% by mass of the catalyst; and
   a zeolite, wherein the zeolite is ZSM-5.

* * * * *

UNITED STATES PATENT AND TRADEMARK OFFICE
CERTIFICATE OF CORRECTION

PATENT NO. : 9,656,252 B2
APPLICATION NO. : 13/503671
DATED : May 23, 2017
INVENTOR(S) : Kazuhito Sato et al.

It is certified that error appears in the above-identified patent and that said Letters Patent is hereby corrected as shown below:

In the Specification

Column 4, Line 54, change "FIG 1 is a" to --"The figure is a"-- and;

Column 9, Line 41, change "13-zeolites" to --"β-zeolites"-- and;

Column 15, Line 66, change "and FIG. 1 show" to --"and the figure show"-- and;

Column 16, Line 19, change "and FIG. 1 show" to --"and the figure show"-- and;

Column 17, Line 58, change "in FIG. 1, it" to --"in the figure, it"--.

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*